United States Patent
Meindl et al.

(10) Patent No.: US 9,200,978 B2
(45) Date of Patent: Dec. 1, 2015

(54) ESTABLISHING A WEAR STATE OF A CUTTING NOZZLE

(71) Applicant: TRUMPF Werkzeugmaschinen GmbH + Co. KG, Ditzingen (DE)

(72) Inventors: Ulrich Meindl, Waldenbuch (DE); Boris Regaard, Gerlingen (DE)

(73) Assignee: TRUMPF Werkzeungmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 14/333,655

(22) Filed: Jul. 17, 2014

(65) Prior Publication Data

US 2015/0022827 A1 Jan. 22, 2015

(30) Foreign Application Priority Data

Jul. 19, 2013 (DE) .......................... 10 2013 214 174

(51) Int. Cl.

| | |
|---|---|
| *G01B 11/24* | (2006.01) |
| *G01M 11/00* | (2006.01) |
| *B23K 26/14* | (2014.01) |
| *B23K 26/38* | (2014.01) |
| *B23K 26/30* | (2014.01) |
| *G01B 11/22* | (2006.01) |

(52) U.S. Cl.
CPC ........... *G01M 11/00* (2013.01); *B23K 26/1494* (2013.01); *B23K 26/38* (2013.01); *B23K 26/422* (2013.01); *G01B 11/22* (2013.01); *G01B 11/24* (2013.01)

(58) Field of Classification Search
CPC combination set(s) only.
See application file for complete search history.

(56) References Cited

U.S. PATENT DOCUMENTS

| | | | |
|---|---|---|---|
| 5,267,381 A | 12/1993 | Wright et al. | |
| 7,679,031 B2 | 3/2010 | Yamazaki et al. | |
| 2005/0122362 A1* | 6/2005 | Hasebe et al. | 347/19 |
| 2012/0318775 A1 | 12/2012 | Schwarz | |

FOREIGN PATENT DOCUMENTS

| | | |
|---|---|---|
| CN | 1701902 A | 11/2005 |
| DE | 102011104550 A1 | 4/2014 |
| EP | 1211015 A1 | 6/2002 |
| EP | 1600247 B1 | 7/2012 |
| FR | 2911081 A1 | 7/2008 |
| JP | 2011045892 A | 3/2011 |

* cited by examiner

Primary Examiner — Tri T Ton
(74) Attorney, Agent, or Firm — Fish & Richardson P.C.

(57) ABSTRACT

Methods, systems, and devices for establishing a wear state of a cutting nozzle of a laser processing machine. An actual state of the cutting nozzle shape is established by a three-dimensional evaluation performed by a nozzle shape sensor and an associated controller. The established actual state of the cutting nozzle shape is compared to a desired state of the cutting nozzle shape, and the wear state of the cutting nozzle is established based on a result of the comparison.

19 Claims, 2 Drawing Sheets

ESTABLISHING A WEAR STATE OF A CUTTING NOZZLE

CROSS REFERENCE TO RELATED APPLICATION

This application claims priority under 35 U.S.C. §119 to German Application No. DE 10 2013 214 174.2 filed on Jul. 19, 2013. The content of this priority application is hereby incorporated by reference in its entirety.

TECHNICAL FIELD

The specification relates to methods, systems, and devices for establishing a wear state of a cutting nozzle of a laser processing machine.

BACKGROUND

Cutting nozzles are used in laser cutting processes to achieve a uniform and high-quality cutting result. The shape of the cutting nozzle has a direct effect on the cutting gas flow and consequently directly influences the cutting result. Consequently, wear of the cutting nozzle which typically occurs during the cutting process also has an influence on the cutting result. The causes of wear of the cutting nozzle are, for example, bonded slag and bonded splashes of the melt of the processed material or burnouts resulting from sweeping or back-reflected laser radiation and direct or sweeping collisions of the cutting nozzle with the workpiece or other components. Owing to such wear, the shape of the cutting nozzle can change in such a manner that the flow relationships at the cutting nozzle also vary. This causes in particular a change of the flow cross-section and consequently the preferred direction of the gas flow. The negative consequence of this is, for example, a cutting result which varies in accordance with the direction, such as, for example, beard deposits of different extents on the workpiece. Furthermore, the above-mentioned causes of wear also influence the measurement of the spacing between the cutting nozzle and the workpiece to be processed during the laser cutting process in a negative manner.

In order to counteract the negative consequences of the causes of wear, it is known for an operator to examine the cutting nozzle manually. However, this requires time-intensive and cost-intensive idle times of the laser processing machine. In addition, the respective operators have to have the relevant experience to be able to carry out the examination in a reliable manner.

SUMMARY

Described below are methods, systems, and devices for establishing a wear state of a cutting nozzle of a laser processing machine.

One aspect of the invention features a method that includes establishing the wear state of the cutting nozzle by a three-dimensional cutting nozzle shape of the cutting nozzle, to increase and improve the method reliability and the method quality during a laser cutting operation.

The wear state established using the three-dimensional cutting nozzle shape can contain depth information relating to the three-dimensional shape of the cutting nozzle, that is to say, information relating to the depth profile of the cutting nozzle or, in other words, the topography of the cutting nozzle and consequently a substantially more precise assessment of the cutting capacity of the cutting nozzle is possible. The more precise assessment extends in particular to the influence of the wear-related three-dimensional change of the cutting nozzle shape on the cutting gas flow during operation. Owing to the detection of the three-dimensional cutting nozzle shape, it is advantageously possible, for example, to quantify indentations, discharges or adhesions on the cutting nozzle and to allow them to be incorporated in the establishment of the wear state of the cutting nozzle. The wear state of cutting nozzles can be assessed in a relatively objective manner. Based on the established wear state, whether or not a nozzle change is required can be assessed.

As used herein, the term "cutting nozzle shape" refers to the entire topography of a cutting nozzle, that is to say, the entire three-dimensional surface geometry of the cutting nozzle, including the gas channel, the cutting front, the nozzle outer cone, etc. The term "wear state" refers to a deviation of the three-dimensional cutting nozzle shape from the original state thereof (the desired state).

Preferably, the wear state is further established by the actual state of the cutting nozzle shape determined by means of a three-dimensional evaluation being compared with a desired state of the cutting nozzle shape. In order to determine the actual state of the cutting nozzle, a three-dimensional actual shape of the cutting nozzle (for example, in the manner of CAD data) as an actual state can be calculated or derived, for example, from one or more camera exposures of a camera device, by means of the three-dimensional evaluation. The actual shape calculated in this manner can subsequently be compared with the desired shape of the cutting nozzle (for example, also in the manner of CAD data). From the deviation of the actual shape from the desired shape or the deviation of the actual state from the desired state, the wear state can subsequently be determined. The desired shape or the desired state can be predetermined and stored in memory of an evaluation unit.

The three-dimensional cutting nozzle shape is preferably detected in a contact-free manner, for example, by means of optical measurement of the cutting nozzle topology. The information relating to the three-dimensional cutting nozzle shape, that is to say, relating to the depth profile of the cutting nozzle, can be detected, for example, optically by means of a confocal microscope.

A preferred variant of the method includes illuminating the cutting nozzle using an illumination device, recording the illuminated cutting nozzle using a camera device, and establishing the wear state of the cutting nozzle by evaluating the camera exposure recorded. In order to detect the three-dimensional cutting nozzle shape, the illumination device and the camera device are arranged relative to each other in such a manner that the wear state is established using information which relates to the cutting nozzle shape and which is obtained by means of three-dimensional evaluation of the camera exposure. The wear state established in this manner, owing to the three-dimensional evaluation of the camera exposure, also contains the depth information relating to the three-dimensional cutting nozzle shape.

The detection of the three-dimensional cutting nozzle shape is preferably carried out using one or more of the following different illumination variants:

On the one hand, the cutting nozzle can be illuminated by the illumination device with structured light, in particular using the light-section method. By means of illumination with structured light, the three-dimensional cutting nozzle shape for the camera device can be made detectable for three-dimensional evaluation. It is possible to use as structured light, for example, one or more lines (light-section) or a point (triangulation) or pseudo-randomly distributed point clouds (random pattern method) for illumination and to observe them at a triangulation angle. Preferably, the three-dimensional surface shape of the cutting nozzle is recorded by the camera device by means of one or more light section(s) which is/are incident at a triangulation angle and which is/are projected onto the cutting nozzle as an illumination line. Owing to continuous detection of the depth profile along the light section, with simultaneous lateral movement of the cutting nozzle relative to the measurement device, the 3D topography of the cutting nozzle (the depth profile) can be detected in a continuous manner. The observation by the camera device can be carried out in this instance, for example, perpendicularly relative to the cutting nozzle or the cutting nozzle front, and the illumination can be carried out by means of the illumination device at an acute angle. Alternatively, the illumination can also be carried out, for example, by means of the illumination device perpendicularly relative to the cutting nozzle and the observation by the camera device can be carried out at an acute angle relative thereto. In principle, the camera device may be arranged or orientated with the optical axis thereof and/or the illumination device with the optical axis thereof at any angles relative to the cutting nozzle or the cutting nozzle front. In this instance, the Scheimpflug angle between the objective lens and the camera device can be taken into consideration for correct imaging when the monitored Z position (depth information) changes. The triangulation angle is typically defined as the angle between the observation direction and the illumination direction.

On the other hand, the cutting nozzle can be illuminated by the illumination device in the manner of incident-light darkfield illumination. In this instance, by means of lateral illumination of the cutting nozzle, only recesses or projections on the cutting nozzle are illuminated.

In a further illumination variant, the cutting nozzle can be illuminated by means of an illumination device which is arranged in the cutting nozzle longitudinal axis in the manner of incident-light brightfield illumination. In a preferred variant of the incident-light brightfield illumination, the cutting nozzle is illuminated by the illumination device from an angular range which substantially corresponds to the numerical aperture of the camera device or is smaller than the numerical aperture of the camera device. Owing to the compliance with this angular range, the cutting nozzle is illuminated almost perpendicularly with a high beam quality so that regions of the cutting nozzle surface whose orientation does not permit any reflection of the illumination into the camera device, appear darker than regions of the cutting nozzle surface whose orientation enables a direct reflection into the camera device. Consequently, the recognition and evaluation of recesses and/or projections of the cutting nozzle shape are also possible.

The three-dimensional cutting nozzle shape is at the same time preferably detected by at least two of the illumination variants which are selected from the group comprising: illumination in the light-section method, illumination in the manner of incident-light darkfield illumination or illumination in the manner of incident-light brightfield illumination. Owing to the combination of at least two of the illumination variants according to the invention, even more precise assessment of the cutting capacity of a cutting nozzle which has been subjected to wear can be achieved. Of course, the illumination variants according to the invention can also be combined with a two-dimensional evaluation of the cutting nozzle.

In some implementations, the three-dimensional cutting nozzle shape is detected by scanning the cutting nozzle. The scanning can take place, for example, using mechanical means in a tactile manner (using needle-like scanning elements). Alternatively, the scanning can also be carried out in a contactless manner using electrical, in particular capacitive, means.

Preferably, the three-dimensional shape of the cutting nozzle front is detected. In this manner, particularly precise establishment of the wear state is possible since the influence of the wear-related change in geometry of the cutting nozzle is particularly evident on the cutting gas guide, that is to say, the flow relationships at the cutting nozzle, and consequently the cutting capacity of the cutting nozzle.

Another aspect of the invention features a laser processing machine including a laser processing head having a cutting nozzle arranged thereon and a sensor unit for detecting a three-dimensional cutting nozzle shape of the cutting nozzle, with an evaluation unit programmed to establish a wear state of the cutting nozzle using the three-dimensional cutting nozzle shape.

Other advantages and advantageous embodiments of the subject-matter of the invention will be appreciated from the description, the claims and the drawings. The features mentioned above and those set out below may also be used individually per se or together in any combination. The embodiments shown and described are not intended to be understood to be a conclusive listing but are instead of exemplary character for describing the invention. The Figures of the drawings show the subject-matter according to the invention in a highly schematic manner and are not intended to be understood to be to scale.

DESCRIPTION OF DRAWINGS

In the following description of the drawings, identical reference numerals are used for components which are the same or which have the same function.

DETAILED DESCRIPTION

Figure 1A:
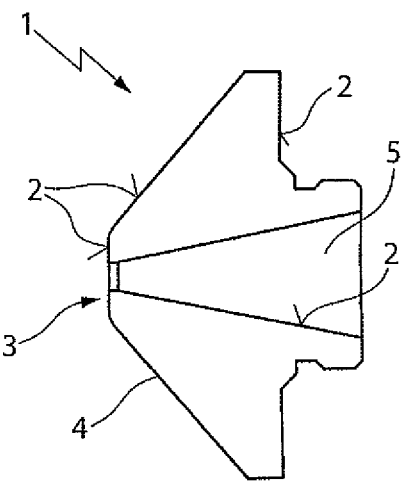
FIGS. 1a, 1b are a cross-section and a front view of a cutting nozzle, respectively.
Figure 1B:
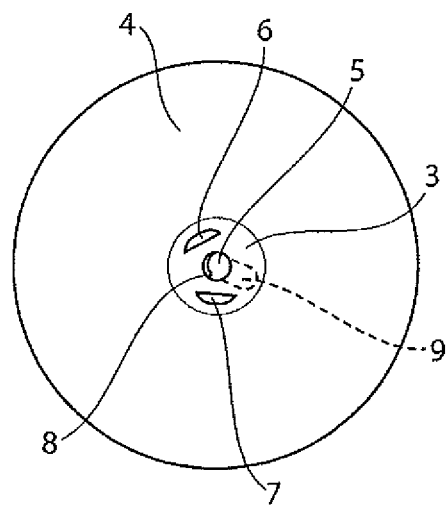

The cutting nozzle 1 shown in FIGS. 1a, 1b is used for laser cutting of workpieces. The cutting nozzle 1 has a cutting nozzle shape 2 which is characterised by a three-dimensional surface geometry and which is delimited inter alia by a cutting front 3 of the cutting nozzle 1, a nozzle outer cone 4 of the cutting nozzle 1 and a gas channel 5 of the cutting nozzle 1.

During the laser cutting, defects on the cutting nozzle 1 occur, typically as a result of wear. A first wear-related defect of the cutting nozzle 1 may be a three-dimensional defect location 6 in the cutting nozzle material, such as, for example, burnouts resulting from sweeping or back-reflected laser radiation or scratches as a result of collisions of the cutting nozzle 1 with the workpiece. Another wear-related defect may be a three-dimensional material deposit 7 on the cutting nozzle front 3, such as, for example, bonded slag or splashes of the molten mass of the processed workpiece material. Furthermore, narrowings 8 of the geometry of the gas channel 5, which have been brought about, for example, by collisions of the cutting nozzle 1 with the workpiece or other components, or burnouts 9 of the gas channel 5 may also be wear-related defects of the cutting nozzle 1. All the defects described above constitute changes in the original cutting nozzle shape 2 which may have a negative influence on the laser cutting process depending on the current state of wear. This is because the defects, on the one hand, change the flow relationships at the cutting nozzle 1, so that a uniform cutting result is generally no longer achieved and, on the other hand, they also impair the detection of the spacing between the cutting nozzle 1 and the workpiece, which detection is relevant for controlling the cutting process.

Figure 2:
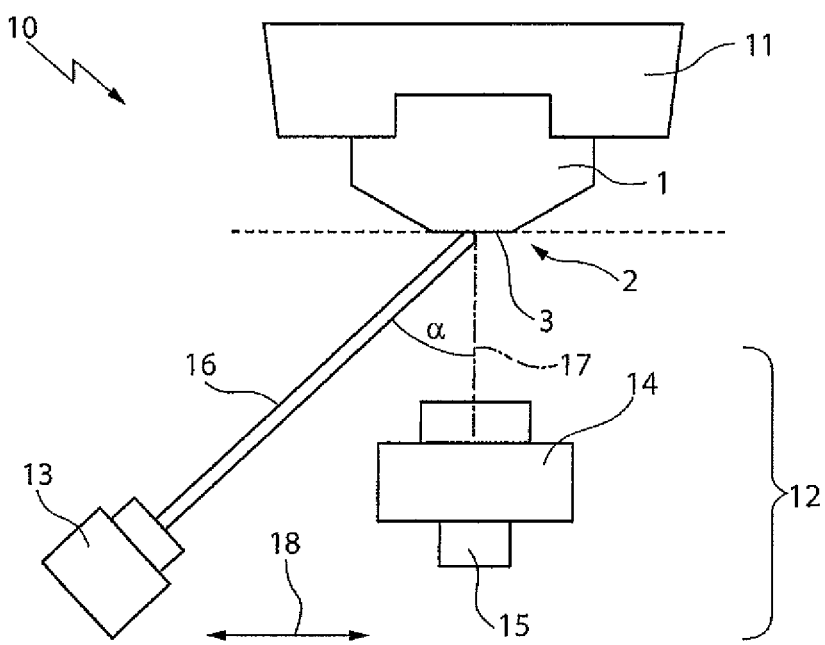
FIG. 2 is a cutting nozzle which is illuminated using the light-section method.

FIG. 2 shows a laser processing machine 10 having a laser processing head 11 which has a cutting nozzle 1 according to FIG. 1 and a sensor unit 12 for detecting the three-dimensional cutting nozzle shape 2. The sensor unit 12 comprises an illumination device which is constructed as a laser 13 for producing a laser light-section 16 for illuminating the cutting nozzle 1, a camera device 14 for recording the illuminated cutting nozzle 1 and an evaluation unit 15. In order to establish the current wear state of the cutting nozzle 1, a method is carried out in the following manner.

In order to detect the three-dimensional cutting nozzle shape 2, in particular in order to detect the three-dimensional shape of the cutting nozzle front 3, the cutting nozzle 1 is illuminated in a first method step by means of the laser 13 using the light-section method. To this end, the light section 16 is produced by the laser 13 and projected onto the cutting nozzle 1 at a so-called triangulation angle $\alpha$ (for example, at $\alpha=45$ degrees), so that an illumination line which is in the form of a laser line appears on the cutting nozzle 1. In order to detect the three-dimensional cutting nozzle shape 2, the laser 13 and the camera device 14 are arranged in a corresponding manner with respect to each other, that is to say, the camera device 14 is arranged with the optical axis 17 thereof at an angle of 90 degrees with respect to the cutting nozzle front 3 and the laser 13 is arranged at the triangulation angle $\alpha$ with respect to the cutting nozzle front 3 or the cutting nozzle 1. In another method step, the illuminated cutting nozzle 1 is recorded by means of the camera device 14, that is to say, the projected laser line is recorded by the camera device 14. Then, in another method step, the wear state of the cutting nozzle 1 can be established by the camera exposure recorded being evaluated in a three-dimensional manner, that is to say, by information relating to the three-dimensional cutting nozzle shape 2 being obtained from the camera exposure or being calculated by means of image processing.

From the camera exposures, based on the known triangulation angle $\alpha$ as information relating to the three-dimensional cutting nozzle shape 2, it is possible to calculate in a trigonometric manner the Z coordinates (that is to say, the coordinates perpendicular relative to a camera image plane) of all the points along the laser line. The evaluation unit 15 is programmed, using this three-dimensional evaluation of the camera exposure, to obtain the information relating to the three-dimensional cutting nozzle shape 2 (in particular the Z coordinates) and to establish the wear state based on this information. Owing to the calculated information relating to the three-dimensional cutting nozzle shape 2 (for example, in the form of the three-dimensional coordinates), the actual state of the cutting nozzle shape 2 can be established and compared with a desired state of the cutting nozzle shape 2. Based on the comparison between the actual state and the desired state, conclusions can be drawn relating to the (current) wear state of the cutting nozzle 1. If the wear state established exceeds a predetermined or permissible value, a cutting nozzle change may be initiated.

The determination of the wear is established in particular based on the three-dimensional defect locations 6 in the cutting nozzle material and/or based on the three-dimensional material deposits 7 at the cutting nozzle 1 and/or based on the geometry of the cutting nozzle gas channel 5. These defect locations 6, material deposits 7 and geometry changes 8, 9 constitute deviations of the actual state from the desired state. In order to establish the wear state based on the geometry of the cutting nozzle gas channel 5, it is possible to use, for example, the size of the diameter of the gas channel 5 or the roundness thereof. Deviations from the original size of the diameter or from the original desired geometry may occur, for example, owing to collisions with workpieces or the above-described rejects and adhesions. In order to detect the complete three-dimensional cutting nozzle shape 2, the sensor unit 12 and the cutting nozzle 1 are arranged so as to be able to be displaced relative to each other, in particular in a direction 18 parallel with the cutting front 3. Consequently, owing to relative movements of the laser line projected by the laser 13 in relation to the cutting nozzle 1, the entire cutting nozzle shape 2 can be travelled and detected.

Figure 3:
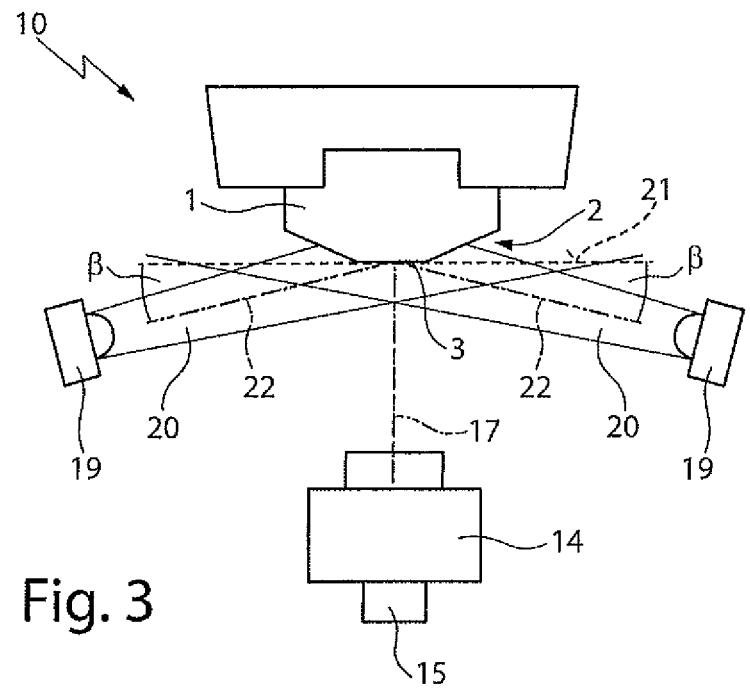
FIG. 3 is a cutting nozzle which is illuminated in the manner of darkfield illumination.

In the laser processing machine 10 illustrated in FIG. 3, in order to illuminate the cutting nozzle 1, two illumination devices 19 which are constructed as an incident-light darkfield illumination unit are provided. Accordingly, in a method for detecting the three-dimensional cutting nozzle shape 2, in the first method step the cutting nozzle 1 is illuminated by the illumination device 19 in the manner of incident-light darkfield illumination. To this end, the cutting nozzle 1 is illuminated with lateral illumination cones 20 which are directed onto the cutting nozzle 1 at an incident angle $\beta$ of approximately 15 degrees with respect to the plane 21 of the cutting nozzle front 3 and preferably surround the cutting nozzle 1. The illumination devices 19 and the camera device 14 are accordingly arranged with respect to each other for this purpose, that is to say, the camera device 14 is arranged with the optical axis 17 thereof at an angle of approximately 90 degrees with respect to the cutting nozzle front 3 and the illumination devices 19 are arranged with their optical axes 22 at the angle $\beta=15$ degrees with respect to the plane 21 of the cutting nozzle front 3. The three-dimensional defects and occurrences of unevenness (recesses 6 or projections 7) which deviate from the plane 21, are thereby visible in the incident-light darkfield. In the case of the incident-light darkfield illumination, the illumination cones 20 are orientated in such a manner that the radiation reflected directly from the cutting nozzle 1 does not strike the camera device 14 but instead only radiation which is redirected on the occurrences of unevenness (for example, scattered, bent or refracted radiation) reaches the camera device 14. In the next method step, the cutting nozzle 1 which is illuminated in this manner is recorded by the camera device 14 and the wear state is established by means of information which relates to the cutting nozzle shape 2 and which is obtained by means of three-dimensional evaluation of the camera exposure. When the incident-light darkfield camera exposures are evaluated by the evaluation unit 15, illuminated regions can be extracted, for example, by means of a static or dynamic threshold value or an edge detection algorithm (for example, Canny).

Figure 4:
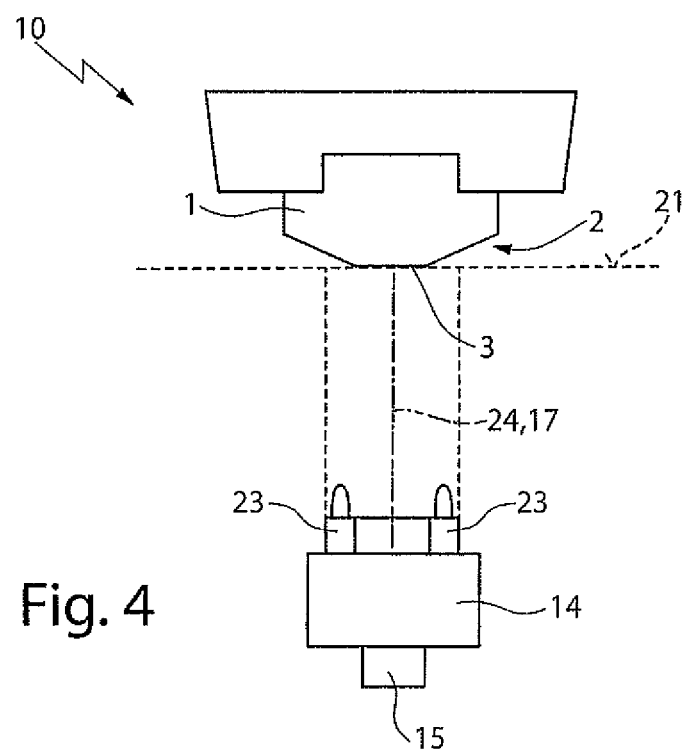
FIG. 4 is a cutting nozzle which is illuminated in the manner of brightfield illumination.

FIG. 4 finally shows a laser processing machine 10 in which, in contrast to the previous Figures, an illumination device which is constructed as an incident-light brightfield illumination unit (for example, as a diode laser) 23 and which is arranged in the cutting nozzle longitudinal axis 24 is provided in order to illuminate the cutting nozzle 1. In a method for detecting the three-dimensional cutting nozzle shape 2, in a first method step the cutting nozzle 1 is at least partially illuminated by the incident-light brightfield illumination 23 from an angular range (perpendicular with a high beam quality) which substantially corresponds to the numerical aperture of the camera device 14. In order to detect the three-dimensional cutting front 3, both the incident-light brightfield illumination 23 and the camera device 14 are mutually arranged for this purpose with their optical axes 17 at 90 degrees with respect to the cutting nozzle front 3. At the cutting nozzle 1, defects and occurrences of unevenness which have been formed by wear, in particular defects present on the cutting nozzle front 3 whose projections or recesses deviate from the perpendicularly illuminated plane 21 of the cutting nozzle front 3, reflect the illumination light not directly back to the camera device 14 but instead at least partially in directions which can no longer be detected by the camera device 14. In the camera exposure of the illuminated cutting nozzle 1 recorded in the next method step, the three-dimensional defects consequently appear dark (or darker) and therefore differ from the planar (or defect-free) cutting front 3. In the last method step, the wear state can be established by means of the information which relates to the cutting nozzle shape 2 and which is obtained by means of the three-dimensional evaluation of the camera exposure. In order to evaluate the camera exposures and to establish the wear state, an evaluation unit 15 is also provided.

In contrast to what is shown in the Figures, the three-dimensional cutting nozzle shape 2 can at the same time be detected by means of at least two of the above-described illumination variants, that is to say, the sensor unit 12 of the laser processing machine 10 may, for example, have a single camera device 14 for the light-section illumination and the darkfield illumination or a camera device 14 for the light-section illumination and a camera device 14 for the darkfield illumination and an illumination device for the light-section illumination 13 and an illumination device for the darkfield illumination 19. Owing to the simultaneous (or parallel) observation using different illumination variants, the precision of the establishment of the wear state of the cutting nozzle 1 can be further increased.

A number of embodiments of the invention have been described. Nevertheless, it will be understood that various modifications may be made without departing from the spirit and scope of the invention. Accordingly, other embodiments are within the scope of the following claims.

What is claimed is:

1. A method of establishing a wear state of a cutting nozzle of a laser processing machine, the method comprising:
   establishing an actual state of the cutting nozzle shape by depth information of the cutting nozzle performed by a nozzle shape sensor and an associated controller, the nozzle shape sensor including an illumination device and a camera, wherein establishing the actual state of the cutting nozzle shape comprises:
      illuminating the cutting nozzle by the illumination device with structured light including one or more lines, one or more points, or both;
      recording data representing an image of the illuminated cutting nozzle using the camera; and
      evaluating the recorded data to establish the actual state of the cutting nozzle shape using the associated controller, and wherein the illumination device and the camera are arranged relative to each other, such that the actual state of the cutting nozzle shape is established using information obtained by a three-dimensional evaluation of the recorded data;
   comparing the established actual state of the cutting nozzle shape with a desired state of the cutting nozzle shape using the associated controller; and
   establishing the wear state of the cutting nozzle based on a result of the comparison using the associated controller.

2. The method of claim 1, further comprising:
   recording digital data corresponding to the actual state of the cutting nozzle shape using the nozzle shape sensor; and
   performing the three-dimensional evaluation based on the recorded digital data using the associated controller.

3. The method of claim 1, wherein comparing the established actual state of the cutting nozzle shape with a desired state of the cutting nozzle shape comprises:
   digitally comparing data representing the established actual state of the cutting nozzle shape with stored data representing the desired state of the cutting nozzle shape.

4. The method of claim 1, wherein establishing the wear state of the cutting nozzle comprises establishing the wear state based on at least one of three-dimensional defect locations in cutting nozzle material, three-dimensional material deposits on the cutting nozzle, and a geometry of a cutting nozzle gas channel.

5. The method of claim 1 wherein the illumination device and the camera are arranged relative to each other such that the structured light illuminating the cutting nozzle is observed by the camera at a triangulation angle between the illumination direction and the observation direction, and wherein the camera is arranged with an optical axis perpendicular to a front of the cutting nozzle, and the illumination device is arranged at the triangulation angle with respect to the front of the cutting nozzle.

6. The method of claim 1, wherein illuminating the cutting nozzle comprises illuminating the cutting nozzle by the illumination device in a manner of incident-light darkfield illumination.

7. The method of claim 6, wherein illuminating the cutting nozzle comprises directing a lateral illumination cone from the illumination device onto the cutting nozzle, and
   wherein the illumination device and the camera are arranged such that a first radiation reflected directly from the cutting nozzle bypasses the camera and a second radiation reflected by an occurrence of unevenness is intercepted by the camera.

8. The method of claim 1, wherein the illumination device is arranged along a longitudinal axis of the cutting nozzle in a manner of incident-light brightfield illumination.

9. The method of claim 8, wherein illuminating the cutting nozzle comprises illuminating the cutting nozzle by the illumination device from an angular range that substantially corresponds to a numerical aperture of the camera or is smaller than the numerical aperture of the camera.

10. The method of claim 1, wherein establishing the actual state of the cutting nozzle shape comprises detecting a three-dimensional cutting nozzle shape simultaneously using at least two of illumination in a manner of a light-section method, illumination in a manner of incident-light darkfield illumination, and illumination in a manner of incident-light brightfield illumination.

11. The method of claim 10, wherein recording data representing the image of the illuminated cutting nozzle comprises using the camera to record data corresponding to each of light-section illumination and darkfield illumination.

12. The method of claim 1, wherein establishing the actual state of the cutting nozzle shape comprises establishing a three-dimensional shape of a front of the cutting nozzle.

13. A laser processing machine comprising:
   a laser processing head having a cutting nozzle arranged thereon; and
   a sensor unit for detecting depth information of the cutting nozzle, the sensor unit having an evaluation unit running code configured to establish a wear state of the cutting nozzle based on the depth information of the cutting nozzle, wherein the sensor unit includes an illumination device for illuminating the cutting nozzle with structured light including one or more lines, one or more points, or both and a camera for recording data representing an image of the illuminated cutting nozzle, and wherein the evaluation unit is configured to perform a three-dimensional evaluation of the recorded data to obtain information of the depth information of the cutting nozzle and to establish the wear state based on the obtained information.

14. The laser processing machine of claim 13, wherein the sensor unit and the cutting nozzle are arranged such that the sensor unit and the cutting nozzle can be moved relative to each other to detect a three-dimensional cutting nozzle shape.

15. The method of claim 1, further comprising:
continuously detecting the depth information along a laser light-section including the one or more lines using the nozzle shape sensor, with simultaneous lateral movement of the cutting nozzle relative to the nozzle shape sensor.

16. The method of claim 1, wherein the structured light comprises pseudo-randomly distributed point clouds for illumination.

17. The laser processing machine of claim 13, wherein the structured light comprises pseudo-randomly distributed point clouds for illumination.

18. The laser processing machine of claim 13, wherein the illumination device is constructed to include one of:
an incident-light darkfield illumination unit, and
an incident-light brightfield illumination unit.

19. The laser processing machine of claim 14, wherein the sensor unit is configured to continuously detect the depth information along a laser light-section including the one or more lines with simultaneous lateral movement of the cutting nozzle relative to the sensor unit.

* * * * *